June 10, 1958   J. H. MORAWITZ   2,837,836
TEACHING AID
Filed Aug. 1, 1955   2 Sheets-Sheet 1
Fig. 1
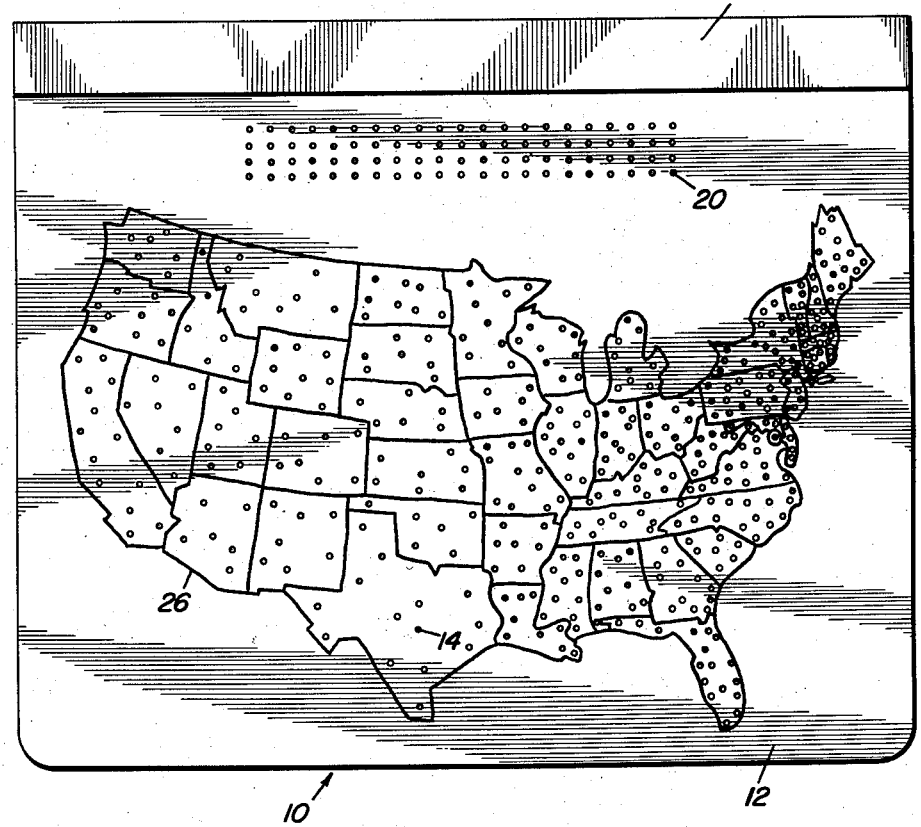
Fig. 2
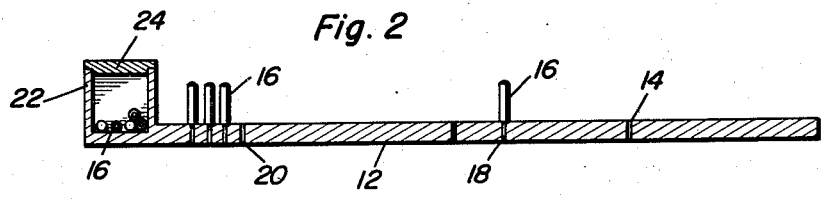
Fig. 3
John H. Morawitz
INVENTOR.
BY
Attorneys June 10, 1958  J. H. MORAWITZ  2,837,836
TEACHING AID
Filed Aug. 1, 1955  2 Sheets-Sheet 2
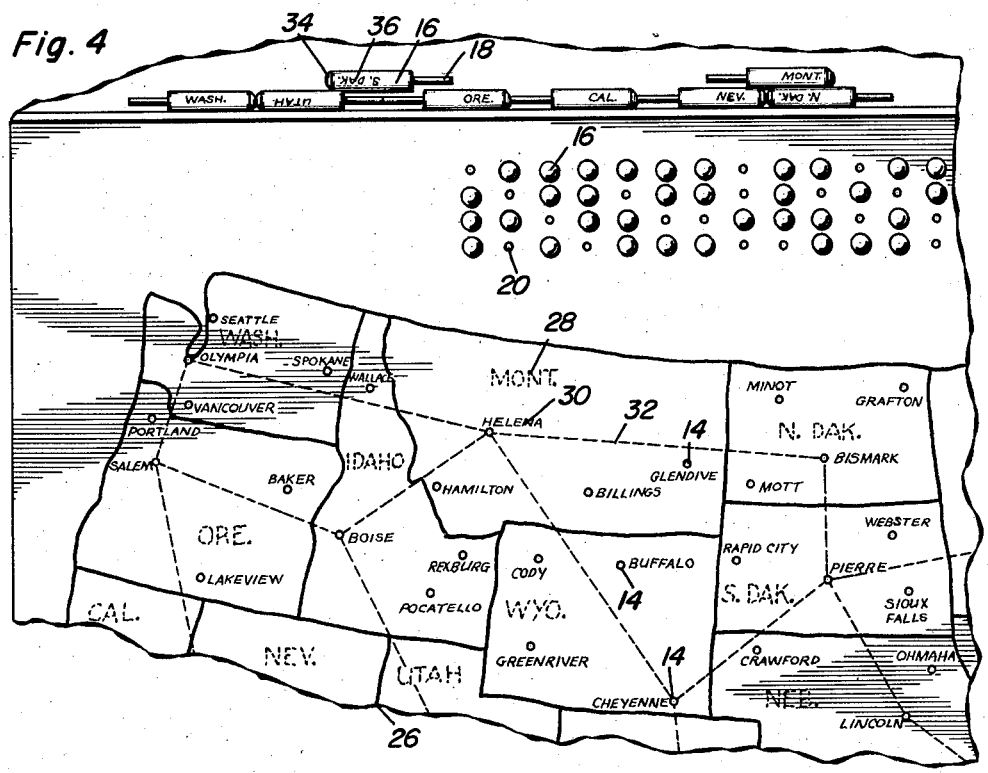
Fig. 4
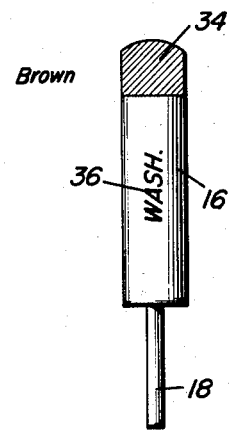
Fig. 5  Brown
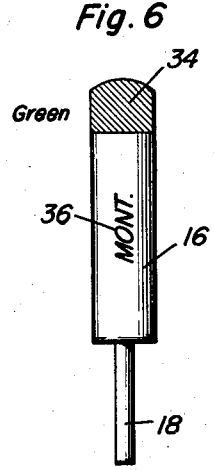
Fig. 6  Green
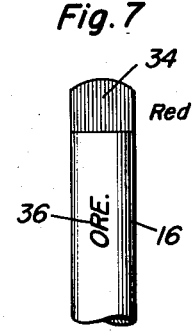
Fig. 7  Red
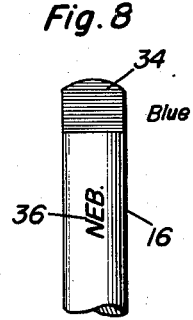
Fig. 8  Blue
John H. Morawitz
INVENTOR.
BY *Clarence A. O'Brien*
*and Harvey B. Jacobson*
Attorneys United States Patent Office 2,837,836
Patented June 10, 1958

2,837,836
TEACHING AID

John H. Morawitz, Hannibal, Mo., assignor of twenty percent to Henry L. Morawitz, Hannibal, Mo.

Application August 1, 1955, Serial No. 525,543

7 Claims. (Cl. 35—9)

This invention generally relates to new and useful improvements in the construction and operation of a teaching aid to facilitate the dissemination of knowledge wherein the persons employ a highly intriguing phenomenon in playing a type of game wherein the device is especially adapted for group competition in order to facilitate the teaching of certain information.

An object of the present invention is to provide a teaching aid in the nature of a game specifically adapted for teaching state locations as well as state capitals, but which may be employed in teaching other information if desired.

Another object of the present invention is to provide a teaching aid in accordance with the preceding object in which invisible inks and ultra-violet lamps are utilized in conjunction with the game, thereby making it more interesting and accepted by students using the device.

A further object of the invention is to provide a teaching aid to stimulate interest in the physics of light and to teach rules of grammar, mathematics and word vocabulary.

Other objects of the present invention will reside in its simplicity of construction, ease of adaptation for various purposes, novelty in construction, and its relatively inexpensive manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the game board utilized in the present invention;

Figure 2 is a transverse, sectional view taken substantially through the center of the construction of Figure 1;

Figure 3 is a perspective view of one of the insertable pegs utilized in the invention;

Figure 4 is an enlarged fragmental plan view of a portion of the game board of Figure 1 illustrating the details thereof together with the details of the arrangement of the pegs and the storage area therefor; and Figures 5–8 illustrate side elevational views of the insertable pegs utilized in the present invention.

With continuing reference to the accompanying drawings, the numeral 10 generally designates a game board including a generally rectangular flat board member 12 having a plurality of apertures 14 extending therethrough for receiving a plurality of pegs 16 having reduced lower ends 18 which are slightly pointed for insertion into selective apertures or bores 14. At one edge of the board 12, a plurality of apertures or bores 20 are formed in horizontally disposed rows for positioning the pins or pegs 16 during use. Also, the uppermost end of the board 12 is provided with a receptacle 22 having a removable cover 24 thereon for storage of the pegs 16 when they are not in use. Disposed on the upper surface of the bore 12 are indicating lines 26 which form an outline of a geographical country, such as the United States, together with the subdivisions of such a geographical country, such as the various states in the United States. It will be noted that a single bore or aperture 14 is disposed in each of the states marked off by the indicating lines 26 which form division lines between the states and an outline of the map of the United States.

It is pointed out that the apertures 14 are disposed in the states in substantially the position of the state capital of the particular states involved. For instance, the aperture 14 positioned in the State of New York is positioned at a point approximating the position of Albany, the state capital. Also, no other identifying indicia is provided which is visible to the players of the game.

As illustrated in Figure 4, such indicia is actually on the map formed by the lines 26. This indicia is designated by the numeral 28 which is the name of the state together with certain larger and well known cities in the state, as designated by the numeral 30. Also, a continuous line 32 interconnects the apertures 14 in the various states so that the apertures all are interconnected by a designating line 32. Also, all of the indicia 28, 30 and the line 32 are formed from and printed with invisible ink which will show up only when an ultra-violet or infra-red light is employed to illuminate the device, dependent upon which type of ink is employed when the indicia 28, 30 and 32 is formed.

Each of the pegs 16 is provided with a colored top 34 together with indicia 36 thereon for designating the various states. The colors on the peg 16 may be either brown, as in Figure 5, green, as in Figure 6, red, as in Figure 7, or blue, as in Figure 8, or any other color for easily distinguished colors, thereby permitting the device to be played by teams of players or by individual players with the scores of the individual players being readily ascertained by observing the color tip 34 of the respective peg 16. In other words, a peg 16 may be provided with a brown upper end 34 for each of the states, as designated by the indicia 36, and the player assigned to the peg 16 having the brown upper ends 34 will be responsible for the positioning of these pegs and his score will be determined thereby.

It is the object of the game for the players to pick up the peg for a particular state and be able to select the proper hole 14 representing the capital city of this state. Efficiency of playing the game is dependent upon the player knowing the location of the state as well as the correct city, and in general, the location of the city. When all the pegs have been inserted into the apertures 14 in the board, the map and board may be placed under the black light and the scores totaled up. Any peg which is not in a hole through which runs the fluorescent lines is erroneously placed. The fact that the particular state is not illuminated during playing of the game nor is the line 32, the player must determine whether the peg that he is playing is properly positioned in the right state and also properly positioned in the right aperture 14 by the proper city which would be the state capital. If the peg is not inserted in the proper aperture 14, the line 32 illuminated by the ultra-violet or infra-red light will not pass through the peg, thereby readily indicating that the peg is improperly placed.

While the game has been specifically illustrated in conjunction with states and state capitals, it will be readily understood that the device lends itself readily for adaptation in teaching various geographical factors, such as rivers, mountain ranges, lakes, national parks and any other information normally taught to children wherein the association of geographical locations and other pertinent data may be learned by observation. Also, the device may be employed in teaching mathematics and grammar by using small cardboard markers for placement over invisible answers for teaching various rules of procedure in solving problems.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A teaching aid comprising a playing board having a plurality of apertures therein, a plurality of pegs selectively positionable in said apertures, a normally invisible line interconnecting certain of said apertures, said line being formed of invisible ink becoming visible when illuminated thereby designating the pegs properly positioned in the apertures on said line and those improperly positioned in the apertures not on said line.

2. A teaching aid comprising a playing board having a plurality of apertures therein, a plurality of pegs selectively positionable in said apertures, a normally invisible line interconnecting certain of said apertures, said line being formed of invisible ink becoming visible when illuminated thereby designating the pegs properly positioned in the apertures on said line and those improperly positioned in the apertures not on said line, said playing board having an outline of a map of a geographical area and the subdivisions thereof, indicia adjacent each aperture designating pertinent data about each subdivision, each of said pegs having indicia thereon naming the subdivision in which it must be placed, said pegs being properly positioned in the subdivision when the aperture in which it is positioned falls on said invisible line.

3. A teaching aid comprising a playing board having a plurality of apertures therein, a plurality of pegs selectively positionable in said apertures, a normally invisible line interconnecting certain of said apertures, said line being formed of invisible ink becoming visible when illuminated thereby designating the pegs properly positioned in the apertures on said line and those improperly positioned in the apertures not on said line, said playing board having an outline of a map of a geographical area and the subdivisions thereof, indicia adjacent each aperture designating pertinent data about each subdivision, each of said pegs having indicia thereon naming the subdivision in which it must be placed, said pegs being properly positioned in the subdivision when the aperture in which it is positioned falls on said invisible line, said data including the city of the seat of government and other principal cities of the subdivision and said line being continuous between the cities of the seats of governments of the subdivisions.

4. A teaching aid comprising a playing board having a plurality of apertures therein, a plurality of pegs selectively positionable in said apertures, a normally invisible line interconnecting certain of said apertures, said line being formed of invisible ink becoming visible when illuminated thereby designating the pegs properly positioned in the apertures on said line and those improperly positioned in the apertures not on said line, said playing board having an outline of a map of a geographical area and the subdivisions thereof, indicia adjacent each aperture designating pertinent data about each subdivision, each of said pegs having indicia thereon naming the subdivision in which it must be placed, said pegs being properly positioned in the subdivision when the aperture in which it is positioned falls on said invisible line, said data including the city of the seat of government and other principal cities of the subdivision and said line being continuous between the cities of the seats of governments of the subdivisions, said pegs being distinguishably colored on the upper end for permitting a plurality of persons to place pegs in the apertures.

5. A device for aiding in teaching the location of states and state capitals of the states of the United States comprising a board having an outline map of the United States being subdivided into states, said board having a plurality of apertures in each subdivision, indicia adjacent each aperture indicating the principal cities of each state, a plurality of pegs, each peg having the name of a state thereon, said peg being properly positionable in the aperture in the proper subdivision adjacent the state capital, and a continuous line interconnecting the apertures adjacent the state capital cities, said line being formed of normally invisible ink adapted to be illuminated by an ultra-violet light thereby indicating the properly positioned pegs.

6. A device for aiding in teaching the location of states and state capitals of the states of the United States comprising a board having an outline map of the United States being subdivided into states, said board having a plurality of apertures in each subdivision, indicia adjacent each aperture indicating the principal cities of each state, a plurality of pegs, each peg having the name of a state thereon, said peg being properly positionable in the aperture in the proper subdivision adjacent the state capital, and a continuous line interconnecting the apertures adjacent the state capital cities, said line being formed of normally invisible ink adapted to be illuminated by an ultra-violet light thereby indicating the properly positioned pegs, each subdivision having identifying normally invisible indicia to indicate if the pegs are postioned in the proper subdivision.

7. A teaching aid comprising a gameboard having a plurality of playing areas of predetermined shape defined thereon, a plurality of means in each playing area designating locations within that area, a plurality of markers for selective positioning on one of the means in each area, and a line interconnecting one of said means in each area with related ones of said means in adjacent areas, said line being normally invisible whereby the players must rely upon their knowledge of the related said means for positioning said markers on the means, said line being rendered readily discernible when illuminated thus indicating the markers which are positioned on the line and those which are not positioned on the line.

References Cited in the file of this patent

UNITED STATES PATENTS

| 1,868,823 | Goodrich | July 26, 1932 |
| 2,379,468 | Arnold | July 3, 1945 |
| 2,618,866 | Adams | Nov. 25, 1952 |

FOREIGN PATENTS

| 571,384 | Great Britain | Aug. 22, 1945 |